United States Patent
Chen et al.

(10) Patent No.: US 11,635,385 B2
(45) Date of Patent: Apr. 25, 2023

(54) CHARACTERISTIC INFORMATION EXTRACTION METHOD, AND RAPID DETECTION METHOD AND SYSTEM OF ORGANIC POLLUTANTS IN COMPLEX SYSTEM

(71) Applicants: JiMei University, Fujian (CN); Jiangsu University, Jiangsu (CN)

(72) Inventors: Quansheng Chen, Jiangsu (CN); Huanhuan Li, Jiangsu (CN); Qin Ouyang, Jiangsu (CN); Jiaji Zhu, Jiangsu (CN); Yi Xu, Jiangsu (CN); Tianhui Jiao, Jiangsu (CN); Haihui Pan, Jiangsu (CN)

(73) Assignees: JiMei University, Xiamen (CN); Jiangsu University, Zhenjiang (CN)

( * ) Notice: Subject to any disclaimer, the term of this patent is extended or adjusted under 35 U.S.C. 154(b) by 0 days.

(21) Appl. No.: 17/505,870

(22) Filed: Oct. 20, 2021

(65) Prior Publication Data

US 2022/0042918 A1  Feb. 10, 2022

(30) Foreign Application Priority Data

Jun. 29, 2021 (CN) .......................... 202110728532.7

(51) Int. Cl.
*G01N 21/65* (2006.01)
*G01N 21/59* (2006.01)
*G06F 17/18* (2006.01)

(52) U.S. Cl.
CPC ....... *G01N 21/658* (2013.01); *G01N 21/5907* (2013.01); *G06F 17/18* (2013.01); *G01N 2021/5953* (2013.01)

(58) Field of Classification Search
None
See application file for complete search history.

(56) References Cited

U.S. PATENT DOCUMENTS 6,040,191 A * 3/2000 Grow ............... G01N 35/00009
436/172
6,180,415 B1 * 1/2001 Schultz ............... C12Q 1/6816
436/171

(Continued)

FOREIGN PATENT DOCUMENTS

CN  109682789 A  4/2019
CN  111220732 A  6/2020

OTHER PUBLICATIONS

Lu, Y. et al. "Label-free selective SERS detection of PCB-77 based on DNA aptamer modified SiO 2@ Au core/shell nanoparticles." Analyst 139.12 (2014): 3083-3087 (Year: 2014).*

(Continued)

*Primary Examiner* — Tarifur R Chowdhury
*Assistant Examiner* — Roberto Fabian, Jr.

(57) ABSTRACT

A method for fast extracting an organic pollutant in a complex system is disclosed, which includes following steps. A surface-enhanced Raman scattering (SERS) spectrum of an organic pollutant is divided to obtain P wavelength sub-intervals with overlapping regions. The P wavelength sub-intervals are screened to obtain ω wavelength sub-intervals. The ω wavelength sub-intervals are screened to obtain a required wavelength sub-interval. The required wavelength sub-interval is screened to obtain a required wavelength subset. A method and a system for fast detecting an organic pollutant in a complex system are also disclosed.

10 Claims, 10 Drawing Sheets

(56) References Cited

U.S. PATENT DOCUMENTS

| | | | |
|---|---|---|---|
| 2005/0064435 A1* | 3/2005 | Su ............................ | B82Y 5/00 |
| | | | 435/7.1 |
| 2013/0313185 A1* | 11/2013 | Chung ................. | C07K 14/325 |
| | | | 210/490 |
| 2016/0025634 A1* | 1/2016 | Chou ...................... | B29C 33/56 |
| | | | 435/7.1 |

OTHER PUBLICATIONS

Yao, L. et al. "Rapid and sensitive SERS detection of food contaminants by using nano-Ag aggregates with controllable hydrophobicity." Microchemical Journal 166 (2021): 106221 (Year: 2021).*

Machine Translation of CN-111220732-A (Year: 2020).*

* cited by examiner

|  | P₁ | P₂ | P₃ | P₄ | P₅ | P₆ | P₇ | P₈ | P₉ | P₁₀ |
|---|---|---|---|---|---|---|---|---|---|---|
| 1 | 0 | 1 | 1 | 0 | 1 | 0 | 1 | 1 | 1 | 1 |
| 2 | 1 | 0 | 1 | 0 | 1 | 1 | 0 | 1 | 0 | 1 |
| 3 | 0 | 1 | 1 | 0 | 0 | 0 | 1 | 1 | 1 | 1 |
| 4 | 0 | 0 | 1 | 1 | 1 | 1 | 0 | 0 | 0 | 1 |
| 5 | 1 | 1 | 1 | 0 | 0 | 0 | 0 | 1 | 1 | 0 |
| 6 | 1 | 0 | 0 | 0 | 1 | 0 | 1 | 1 | 0 | 1 |
| 7 | 1 | 1 | 1 | 0 | 0 | 0 | 0 | 0 | 1 | 0 |
| 8 | 0 | 1 | 0 | 0 | 1 | 0 | 1 | 1 | 1 | 1 |
| 9 | 1 | 0 | 1 | 1 | 1 | 0 | 0 | 1 | 1 | 0 |
| 10 | 0 | 1 | 1 | 0 | 1 | 0 | 0 | 0 | 0 | 1 |

CHARACTERISTIC INFORMATION EXTRACTION METHOD, AND RAPID DETECTION METHOD AND SYSTEM OF ORGANIC POLLUTANTS IN COMPLEX SYSTEM

CROSS-REFERENCE TO RELATED APPLICATIONS

This application claims the benefit of priority from Chinese Patent Application No. 202110728532.7, filed on Jun. 29, 2021. The content of the aforementioned application, including any intervening amendments thereto, is incorporated herein by reference in its entirety.

TECHNICAL FIELD

This application relates to detection, and more particularly to a characteristic information extraction method, and a rapid detection method and a system of organic pollutants in a complex system.

BACKGROUND

Scattering of light occurs when the light strikes a substance. The wavelength of most scattered light does not change, and such scattering with no change in wavelength is called Rayleigh scattering; whereas the wavelength of a small part of the scattered light will increase or decrease, and this scattering with changing wavelength is called Raman scattering, and its corresponding spectrum is called Raman spectrum. Every substance has a characteristic Raman spectrum, so the Raman spectrum can be used as a "fingerprint" for identifying substances.

Currently, the identification of an organic pollutant includes following steps. Firstly, a surface-enhanced Raman scattering (SERS) spectrum of the organic pollutant is obtained. Secondly, the SERS spectrum of the organic pollutant is matched with a SERS spectrum of a known substance. If the similarity of the SERS spectrum with the known substance exceeds the similarity threshold, the organic pollutant is determined to be the known substance. When matching the SERS spectrum, it is necessary to sample and extract the SERS spectrum. The traditional method is to divide the SERS spectrum into a preset number of multiple wavelength sub-intervals according to a preset width. During the sampling, the light waves used as the dividing lines are often ignored, leading to the missed sampling of valuable light waves and resulting in low identification accuracy of organic pollutants.

SUMMARY

An objective of the present disclosure is to provide a characteristic information extraction method, and a rapid detection method and a system of organic pollutants in a complex system, so as to solve the problem that during the sampling, the light waves used as the dividing lines are often ignored, leading to the missed sampling of valuable light waves and resulting in low identification accuracy of organic pollutants.

The technical solutions of the present disclosure to solve the above-mentioned problem are described as follows.

In a first aspect, the present disclosure provides a method for extracting characteristic information of an organic pollutant in a complex system, which comprises:

dividing a surface-enhanced Raman scattering (SERS) spectrum of an organic pollutant to obtain P wavelength sub-intervals with overlapping regions; wherein P is a positive integer greater than 0;

screening the P wavelength sub-intervals to obtain $\omega$ wavelength sub-intervals; wherein $\omega$ is a positive integer less than P;

screening the $\omega$ wavelength sub-intervals to obtain a required wavelength sub-interval; and screening the required wavelength sub-interval to obtain a required wavelength subset.

In some embodiments, the step of screening the P wavelength sub-intervals to obtain the $\omega$ wavelength sub-intervals comprises:

sampling the P wavelength sub-intervals to obtain a wavelength sampling matrix $M(K \times P)$; wherein K is the number of sampling; P is the P wavelength sub-intervals arranged in order from small to large; and a value in the wavelength sampling matrix M depends on whether a certain wavelength sub-interval is selected for sampling; wherein a value of 1 in the wavelength sampling matrix M represents the certain wavelength sub-interval is selected; and a value of 0 in the wavelength sampling matrix M represents the certain wavelength sub-interval is not selected;

obtaining K combinations of the P wavelength sub-intervals according to the wavelength sampling matrix M;

establishing K fitting results of the K combinations of the P wavelength sub-intervals according to the K combinations of the P wavelength sub-intervals;

obtaining K first evaluation parameters of the K fitting results according to the K fitting results;

selecting $\sigma*K$ first evaluation parameters from small to large among the K first evaluation parameters and obtaining $\sigma*K$ fitting results corresponding to the $\sigma*K$ first evaluation parameters; wherein $\sigma$ is a preset ratio;

calculating a frequency of each wavelength sub-interval of the P wavelength sub-intervals appearing in the $\sigma*K$ fitting results to obtain P frequencies; and deleting wavelength sub-intervals with a frequency lower than a threshold in the P wavelength sub-intervals to obtain the $\omega$ wavelength sub-intervals; wherein $\omega$ is a positive integer less than P.

In some embodiments, the step of screening the $\omega$ wavelength sub-intervals to obtain the required wavelength sub-interval comprises:

randomly combining the $\omega$ wavelength sub-intervals in an exhaustive manner to obtain $2\omega-1$ combinations of the $\omega$ wavelength sub-intervals;

establishing $2\omega-1$ fitting results of $2\omega-1$ combinations of the $\omega$ wavelength sub-intervals according to the $2\omega-1$ combinations of the $\omega$ wavelength sub-intervals;

obtaining $2\omega-1$ first evaluation parameters of the $2\omega-1$ fitting results according to the $2\omega-1$ fitting results; and selecting a smallest first evaluation parameter among the $2\omega-1$ first evaluation parameters and obtaining a combination of the wavelength sub-intervals corresponding to the smallest first evaluation parameter as the required wavelength sub-interval.

In some embodiments, the step of screening the required wavelength sub-interval to obtain the required wavelength subset comprises:

according to minimum redundancy maximum relevance (mRMR) criterion, sorting wavelengths in the required wavelength sub-interval according to importance to obtain a wavelength subset S;

selecting n wavelengths in the wavelength subset S in descending order of importance;

establishing n fitting results according to the n wavelengths and obtaining n second evaluation parameters of the n fitting results and n third evaluation parameters of the n fitting results; and selecting a smallest second evaluation parameter among the n second evaluation parameters and a smallest third evaluation parameter among the n third evaluation parameters; and obtaining a wavelength corresponding to the smallest second evaluation parameter and a wavelength corresponding to the smallest third evaluation parameter to be the required wavelength subset.

In a second aspect, the present disclosure provides a method for fast detecting an organic pollutant in a complex system, which comprises:

receiving a SERS spectrum of an organic pollutant;

obtaining a required wavelength subset of the SERS spectrum of the organic pollutant according to the method for extracting characteristic information of the organic pollutant in the complex system; and inputting the required wavelength subset into a new model to establish a mathematical relationship of a residual amount of organic pollutant to the required wavelength subset.

In some embodiments, the step of inputting the required wavelength subset into a new model to establish the mathematical relationship of the residual amount of organic pollutant to the required wavelength subset comprises:

receiving the SERS spectrum of the organic pollutant and the residual amount of the organic pollutant corresponding to the SERS spectrum; wherein the SERS spectrum of the organic pollutant is collected after Raman scattering enhancement is performed on the organic pollutant through a SERS response medium;

obtaining a required wavelength subset of the SERS spectrum of the organic pollutant according to the method for extracting characteristic information of the organic pollutant in the complex system;

obtaining an initial mathematical relationship through establishing a new model for the required wavelength subset and the residual amount of the organic pollutant; and verifying the initial mathematical relationship; and obtaining a trained mathematical relationship when the initial mathematical relationship meets a preset condition.

In some embodiments, the mathematical relationship is a new learning algorithm; an output of each convolutional layer in the mathematical relationship is directly related to an input small area; a training of the mathematical relationship adopts an adaptive moment estimation algorithm with a cross-entropy error loss function as an objective function; and the objective function is:

$$0 = \frac{1}{M}\sum_{m=1}^{M}\left[X_m \log \tilde{X}_m + (1-X_m)\log(1-\tilde{X}_m)\right] + \partial // \theta //^2;$$

wherein M is the number of samples; $X_m$ is a target category; $\tilde{X}_m$ is a predicted category; $\partial$ is the regularized coefficient; and $\theta$ is a weight.

In a third aspect, the present disclosure provides a system for fast detecting an organic pollutant in a complex system, which comprises:

a SERS response medium configured for enhancing a Raman scattering intensity of the organic pollutant;

a reaction generating device configured for allowing the organic pollutant and the SERS response medium to react thereon;

a Raman spectrum detection device configured for collecting a SERS spectrum of the organic pollutant after a reaction occurs on the reaction generating device; and a server, wherein the server is signally connected to the Raman spectrum detection device; and the method for fast detecting the organic pollutant in the complex system is deployed in the server;

wherein the Raman spectrum detection device sends the SERS spectrum of the organic pollutant to the server; and the server receives the SERS spectrum of the organic pollutant sent by the Raman spectrum detection device and obtains a residual amount of the organic pollutant responding to the SERS spectrum of the organic pollutant according to the method for fast detecting the organic pollutant in the complex system.

In some embodiments, the system further comprises:

a terminal;

wherein the terminal is signally connected to the server; the terminal sends a query to the server for a detection result of the organic pollutant; the server generates a corresponding query result according to the query and sends the query result to the terminal; and the terminal displays the detection result of the organic pollutant according to the query result.

In some embodiments, a SERS spectrum cloud analysis platform is built on the server; the SERS spectrum cloud analysis platform is configured to store SERS spectrum data and a source program of the detection method; and the server provides an IP address and a listening port for the terminal to request access, so as to enable the terminal to query historical SERS spectrum data and update a source program of the detection method from the SERS spectrum cloud analysis platform through the IP address and the listening port.

In some embodiments, the SERS response medium comprises:

a SERS substrate; and a nucleic acid strand;

wherein a binding site of the nucleic acid strand is obtained according to a pairing template of the nucleic acid strand; and the SERS substrate is site-selectively assembled to the binding site of the nucleic acid strand to obtain the SERS response medium.

In some embodiments, the reaction generating device comprises:

a hydrophilic layer; and a hydrophobic layer;

wherein the hydrophilic layer is configured to absorb the organic pollutant and the SERS response medium dropped thereon; the organic pollutant and the SERS response medium are dropped at different locations; and the hydrophobic layer is configured to guide the organic pollutant and the SERS response medium at different positions on the hydrophilic layer to a reaction position on the hydrophilic layer such that the organic pollutant and the SERS response medium react at the reaction position.

In some embodiments, the hydrophilic layer comprises:

a first area;

a second area; and a third area;

wherein the first area and the second area are respectively connected to the third area; the first area is configured to absorb the organic pollutant dropped thereon; the second area is configured to absorb the SERS response medium dropped thereon; the hydrophobic layer wraps the first area, the second area and the third area to guide the organic pollutant dropped on the first area and the SERS response medium dropped on the second area to the third area, such that the organic pollutant and the SERS response medium reacts in the third area; one side of the first area, one side of the second area and one side of the third area are not wrapped by the hydrophobic layer; the organic pollutant is capable of being dropped on the first area through the side of the first area not wrapped by the hydrophobic layer; and the SERS response medium is capable of being dropped on the second area through the side of the second area not wrapped by the hydrophobic layer.

In some embodiments, the hydrophilic layer is made of a film material with a porosity of 50%-80%.

The beneficial effects of the present disclosure are described as follows.

The SERS spectrum of the organic pollutant is divided to obtain P wavelength sub-intervals with overlapping regions. The P wavelength sub-intervals with overlapping regions can prevent the missed sampling of valuable light waves used as the dividing lines, such that all light waves in the SERS spectrum can be sampled during division, guaranteeing the comprehensiveness of SERS spectrum extraction and improving the identification accuracy of organic pollutants. The P wavelength sub-intervals are screened to obtain $\omega$ wavelength sub-intervals. The $\omega$ wavelength sub-intervals are screened to obtain a required wavelength sub-interval. The required wavelength sub-interval is screened to obtain a required wavelength subset. Such a setting can prevent the less valuable light waves from affecting the final test results, such that the valuable light waves can accurately reflect the structural characteristics of the organic pollutant, improving the robustness of the method for extracting characteristic information of the organic pollutant in the complex system.

BRIEF DESCRIPTION OF THE DRAWINGS

The embodiments of the present disclosure or the technical solutions in the prior art will be described more clearly below with reference to the accompanying drawings. Obviously, the drawings described below are only some embodiments of the present disclosure, and other drawings can be made by those skilled in the art without sparing creative work.

DETAILED DESCRIPTION OF EMBODIMENTS

Figure 1:
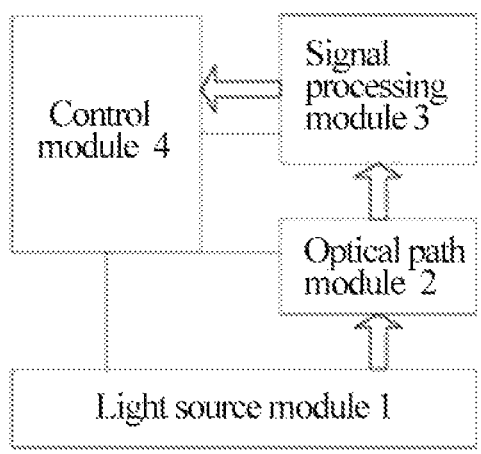
FIG. 1 is a block diagram of an overall structure of a Raman spectrum detection device according to an embodiment of the present disclosure.

The technical solutions in the embodiments of the present disclosure will be clearly and completely described below with reference to the accompanying drawings. Obviously, the embodiments provided herein are a part of the embodiments of the present disclosure, and all other embodiments made by those skilled in the art without sparing creative work should fall within the scope of the present disclosure.

It should be noted that all directional indications (such as up, down, left, right, front, back) in the embodiments provided herein are only used to explain the interaction between components in a specific posture (as shown in the accompanying drawings). If the relative position relationship and movement situation change, the directional indications will change accordingly.

In addition, the terms such as "first" and "second" are only used for illustrative purposes, and cannot be understood as indicating or implying their relative importance or implicitly indicating the number of indicated technical features. Therefore, the features defined with "first" and "second" may explicitly or implicitly include at least one of the features. In addition, the "and/or" includes three solutions. For example, "A and/or B" includes the A technical solution, the B technical solution and the technical solution that A and B meet at the same time. The technical solutions between various embodiments can be combined with each other based on what can be achieved by those skilled in the art. When the combination of technical solutions is contradictory or cannot be achieved, it should be considered that such a combination of technical solutions does not exist, and is not within the protection scope of the present disclosure.

In an embodiment, a system for fast detecting an organic pollutant in a complex system includes a surface-enhanced Raman scattering (SERS) response medium, a reaction generating device, a Raman spectrum detection device and a server. The SERS response medium is configured for enhancing a Raman scattering intensity of the organic pollutant. The reaction generating device is configured for allowing the organic pollutant and the SERS response medium to react thereon. The Raman spectrum detection device is configured for collecting a SERS spectrum of the organic pollutant after a reaction occurs on the reaction generating device. The server is signally connected to the Raman spectrum detection device. A method for extracting characteristic information of the organic pollutant in the complex system is deployed in the server. The Raman spectrum detection device sends the SERS spectrum of the organic pollutant to the server. The server receives the SERS spectrum of the organic pollutant sent by the Raman spectrum detection device and obtains a residual amount of the organic pollutant responding to the SERS spectrum of the organic pollutant according to the method for fast detecting the organic pollutant in the complex system.

The Raman spectrum detection device and the server adopt a decoupling design. The SERS spectrum of the organic pollutant is collected and uploaded to the server in real time through the Raman spectrum detection device. The server can obtain a detection result of the organic pollutant according to the collected SERS spectrum of the organic pollutant. The difficulties of spectrum modeling and long modeling for the operator in the site are solved, and the operation of the system for fast detecting the organic pollutant in the complex system is simpler and more intelligent.

In this embodiment, the SERS response medium is obtained by a SERS response medium preparation method, which includes the following steps.

A binding site of the nucleic acid strand is obtained according to a pairing template of the nucleic acid strand.

The SERS substrate is site-selectively assembled to the binding site of the nucleic acid strand to obtain the SERS response medium. The SERS response medium is of a three-dimensional stack shape with a relatively large volume.

The nucleic acid strand-induced interface self-assembly technology realize a synthesis of a SERS response medium with any adjustable length relying on the high codability of the nucleic acid strand.

The SERS response medium simulates interactions between molecules and metal nanoparticles through an adsorption site model to study an enhancement factor of the Raman spectrum. Experimental results are compared. A charge transfer and a pre-resonance Raman spectrum of the organic pollutant under an excitation of a charge transfer resonance are simulated to analyze a spectral enhancement mechanism of the organic pollutant, so as to locate an effective information peak of the organic pollutant.

The system further includes a terminal. The terminal is signally connected to the server. The terminal sends a query to the server for a detection result of the organic pollutant. the server generates a corresponding query result according to the query and sends the query result to the terminal. The terminal displays the detection result of the organic pollutant according to the query result. The system is more suitable for ordinary users in operation, and overcomes the limited resources in terminal hardware processing and calculation of complex data, difficulty in establishing mathematical relationships on site, inability to share mathematical relationships and low reuse rate.

Specifically, the terminal is a mobile phone, a tablet computer, a desktop computer or a notebook computer.

A SERS spectrum cloud analysis platform is built on the server. The SERS spectrum cloud analysis platform is configured to store SERS spectrum data and a source program of the detection method. The server provides an IP address and a listening port for the terminal to request access, so as to enable the terminal to query historical SERS spectrum data and update a source program of the detection method from the SERS spectrum cloud analysis platform through the IP address and the listening port. The detection method can be updated uniformly through the SERS spectrum analysis platform. Therefore, there is no need to update each Raman spectrum detection device, improving the update efficiency of the detection method.

The reaction generating device includes a hydrophilic layer and hydrophobic layer. The hydrophilic layer is configured to absorb the organic pollutant and the SERS response medium dropped thereon. The organic pollutant and the SERS response medium are dropped at different locations. The hydrophobic layer is configured to guide the organic pollutant and the SERS response medium at different positions on the hydrophilic layer to a reaction position on the hydrophilic layer such that the organic pollutant and the SERS response medium react at the reaction position.

The hydrophilic layer includes a first area, a second area and a third area. The first area and the second area are respectively connected to the third area. The first area is configured to absorb the organic pollutant dropped thereon. The second area is configured to absorb the SERS response medium dropped thereon. The hydrophobic layer wraps the first area, the second area and the third area to guide the organic pollutant dropped on the first area and the SERS response medium dropped on the second area to the third area, such that the organic pollutant and the SERS response medium reacts in the third area. One side of the first area, one side of the second area and one side of the third area are not wrapped by the hydrophobic layer. The organic pollutant is capable of being dropped on the first area through the side of the first area not wrapped by the hydrophobic layer. The SERS response medium is capable of being dropped on the second area through the side of the second area not wrapped by the hydrophobic layer.

The hydrophilic layer is made of a film material with a porosity of 50%-80%. Such hydrophilic layer has a higher permeability, effectively reducing the resistance between the organic pollutant or the SERS response medium and the hydrophilic layer and improving the transmission rate of the organic pollutant or the SERS response medium in the hydrophilic layer. Therefore, the organic pollutant and the SERS response medium can react quickly at the reaction position, improving the detection efficiency of the organic pollutant.

Preferably, the hydrophilic layer is made of a film material with a porosity of 80%.

As shown in FIG. 1, in an embodiment, a Raman spectrum detection device is provided. The Raman spectrum detection device includes a light source module 1, an optical path module 2, a signal processing module 3 and a control module 4. The control module 4 establishes line connections with the light source module 1, the optical path module 2 and the signal processing module 3 respectively to control the light source module 1, the optical path module 2 and the signal processing module 3. The light source module 1 generates a pulsed laser and emits the pulsed laser to the optical path module 2. The optical path module 2 receives and adjusts the pulsed laser to obtain a target circular beam, and focuses the target circular beam to the organic pollutant. The target circular beam is scattered by the organic pollutant, and the light scattered by the organic pollutant is the scattered light. The optical path module 2 collects the scattered light and filters the scattered light, and sends the filtered scattered light to the signal processing module 3. The signal processing module 3 receives and processes the filtered scattered light to obtain data of a corresponding SERS spectrum. The signal processing module 3 sends the data of the SERS spectrum to the control module 4. The control module 4 receives and analyzes the date of the SERS spectrum to obtain a residual amount of the organic pollutant.

Figure 2:
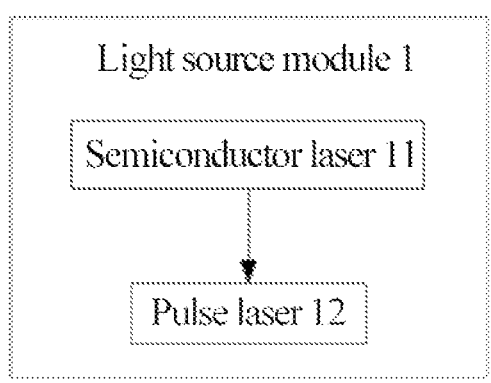
FIG. 2 is a structural block diagram of a light source module according to an embodiment of the present disclosure.

As shown in FIG. 2, the light source module 1 includes a semiconductor laser 11 and a pulse laser 12. The semiconductor laser 11 is configured to generate a seed laser and inject the seed laser into the pulse laser 12 through an optical fiber. The pulse laser 12 is configured to generate a pulsed laser and emit the pulse laser to the optical path module 2.

The seed laser generated by the semiconductor laser 11 is a continuous laser with an ultra-narrow line width, and the seed laser works synchronously with the pulse laser 12 through a corresponding control circuit. When the seed laser is injected into the pulse laser 12, the monochromaticity of the pulsed laser output by the pulse laser 12 will be greatly improved, and the energy thereof will be more stable. If the seed laser is not synchronized with the pulse laser 12, the seed laser will not work during the pulse laser 12 outputting the pulsed laser, resulting in poor quality of the pulsed laser output by the pulse laser 12.

In this embodiment, the semiconductor laser 11 is preferably a narrow linewidth distributed feedback laser, which outputs a seed laser with a wavelength of 1064 nm. The pulse laser 12 is preferably a yttrium aluminum garnet crystal laser, which generates a nanosecond pulse laser with a line width of 0.003-1 cm and a wavelength of 1064 nm during the seed laser injection, and the nanosecond pulse laser is converted into a narrow linewidth nanosecond pulse laser with a wavelength of 532 nm through a frequency-doubled crystal inside the yttrium aluminum garnet crystal laser.

Figure 3:
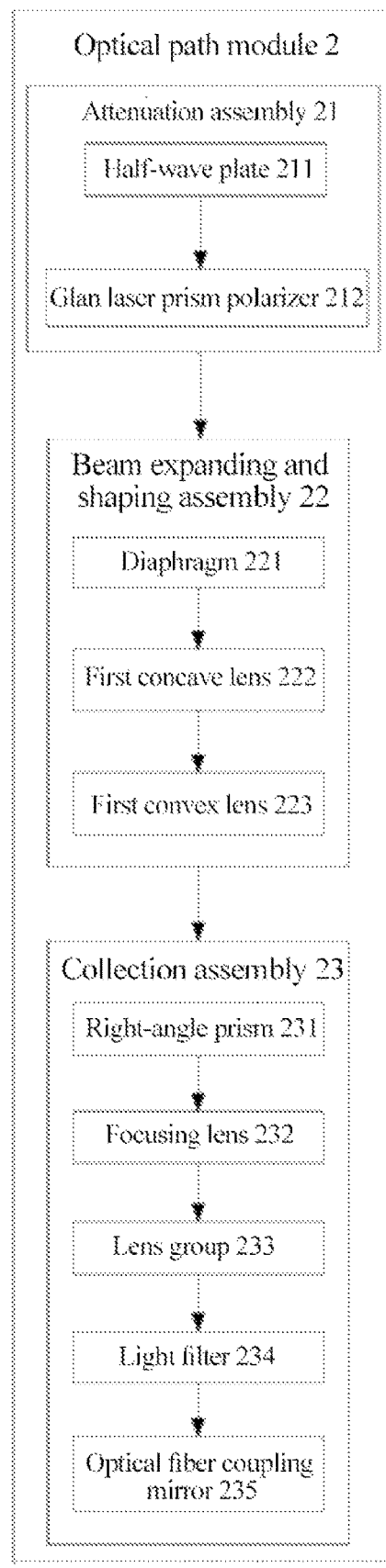
FIG. 3 is a structural block diagram of an optical path module according to an embodiment of the present disclosure.

As shown in FIG. 3, the optical path module 2 includes an attenuation assembly 21, a beam expanding and shaping assembly 22 and a collection assembly 23. The attenuation component 21 receives the pulsed laser from the pulse laser 12 and adjusts the energy of the pulsed laser, and transmits the adjusted pulsed laser to the beam expanding and shaping assembly 22. The beam expanding and shaping assembly 22 receives and expands the adjusted pulsed laser to obtain a target circular beam. The beam expanding and shaping assembly 22 transmits the target circular beam to the collection assembly 23. The collection assembly 23 receives the target circular beam and focuses the target circular beam to the organic pollutant. The organic pollutant scatters the target circular beam to obtain a scattered light. The collection assembly 23 collects the scattered light and filters the scattered light, and transmits the filtered scattered light to the signal processing module 3. In actual use, a user can adjust the beam expanding and shaping assembly 22 and the collection assembly 23 according to environmental conditions of an experiment, such that laser focusing of the optical path module 2 is in a range of 0.5-3 m and a spatial resolution of the optical path module 2 is in a range of 1-10 mm.

It should be noted that when the organic pollutant is detected by the Raman spectrum detection device of this embodiment, a size range of the organic pollutant that can be effectively detected is the spatial resolution of the Raman spectrum detection device, and the spatial resolution represents the resolution capability of the Raman spectrum detection device for different regions of the organic pollutant.

The attenuation component 21 includes a Glan laser prism polarizer 212 and a rotatable half-wave plate 211. The half-wave plate 211 receives the pulsed laser from the pulse laser 12 and changes a polarization angle of the pulsed laser. The half-wave plate 211 sends the changed pulsed laser to the Glan laser prism polarizer 212. The Glan laser prism polarizer 212 receives the changed pulsed laser and splits the changed pulsed laser to obtain horizontally polarized light. The Glan laser prism polarizer 212 sends the horizontally polarized light to the beam expanding and shaping assembly 22.

In an embodiment, the Glan laser prism polarizer 212 acts as a polarization analyzer, splitting the changed pulsed laser into transmittable horizontally polarized light (e-light) and reflectable vertically polarized light. Changing the polarization angle of the pulsed laser by the half-wave plate 211 is to adjust a proportion of the horizontally polarized light in the pulsed laser, so as to control an energy of a transmitted light passing through the Glan laser prism polarizer 212, that is, an energy of the horizontally polarized light passing through the Glan laser prism polarizer 212.

In this embodiment, the half-wave plate 211 is arranged on an electric rotating frame, and the Glan laser prism polarizer 212 is arranged on a fixed frame. The control module 4 controls a rotation of the electric rotating frame to adjust an angle of the half-wave plate 211 with respect to the pulse laser 12 and an angle with respect to the Glan laser prism polarizer 212, so as to adjust the proportion of the horizontally polarized light in the pulsed laser, such that the energy of the horizontally polarized light passing through the Glan laser prism polarizer 212 can be continuously adjusted.

Further, the beam expanding and shaping assembly 22 includes a diaphragm 221, a movable first concave lens 222 and a movable first convex lens 223. The diaphragm 221 receives the horizontally polarized light from the Glan laser prism polarizer 212, and filters the horizontally polarized light to obtain a first circular beam. The diaphragm 221 sends the first circular beam to the first concave lens 222. The concave lens 222 receives and diverges the first circular beam to obtain a second circular beam, and sends the second circular beam to the first convex lens 223. The first convex lens 223 receives and adjusts the second circular beam to obtain a target circle beam, and sends the target circular beam to the collection assembly 23.

In an embodiment, the diaphragm 221 refers to an entity that restricts the light beam in an optical system, and may be an edge of a lens, a frame or a specially arranged apertured screen. The aperture 221 filters the horizontally polarized light, and filters out stray light generated by the pulse laser 12 and the attenuation assembly 21. At the same time, the part with weak energy at an edge of the laser beam is filtered out to obtain the first circular beam with clear edges and uniform intensity.

In this embodiment, the first concave lens 222 is preferably a plano-concave lens. The diaphragm 221 is arranged on a fixed bracket. The first concave lens 222 and the first convex lens 223 are arranged on an electric translation stage, and the control module 4 controls the electric translation stage. A relative distance between the first concave lens 222 and the first convex lens 223 is adjusted through the electric translation stage, and the divergence angle of the target circular beam can be changed, so as to change a size of a laser spot focused on the organic pollutant, such that the spatial resolution of the Raman spectrum detection device can be adjusted.

Further, the collection assembly 23 includes a right-angle prism 231, a focusing lens 232, a lens group 233, a light filter 234, and an optical fiber coupling mirror 235. The right-angle prism 231 receives the target circular beam from the first convex lens 223 and reflects the target circular beam to the focusing lens 232. The focusing lens 232 receives the target circular beam and focuses the target circular beam to the organic pollutant. The organic pollutant scatters the target circular beam. The focusing lens 232 collects the scattered light, and sends the scattered light to the lens group 233. The lens group 233 receives and adjusts the scattered light to obtain a parallel beam, and sends the parallel beam to the light filter 234. The light filter 234 receives the parallel beam and filters the parallel beam to retain Raman scattered light. The light filter 234 sends the Raman scattered light to the optical fiber coupling mirror 235. The fiber coupling mirror 235 receives the Raman scattering light and focuses the Raman scattered light to a fiber port, and the optical fiber coupling mirror 235 transmits the Raman scattered light to the signal processing module 3 through an optical fiber.

In an embodiment, the right-angle prism 231, the focusing lens 232, the lens group 233, the light filter 234 and the optical fiber coupling lens 235 are fixedly arranged in a cage optical path, that is, the right-angle prism 231, the focusing lens 232, the lens group 233, and the light filter 234 and the optical fiber coupling mirror 235 are coaxially arranged. The right-angle prism 231 is arranged between the focusing lens 232 and the lens group 233, and a size of the right-angle prism 231 is much smaller than that of the focusing lens 232 and the lens group 233, which will not affect transmission of the scattered light between the focusing lens 232 and the lens group 233. After being reflected by the right-angle prism 231, the target circular beam is irradiated on the organic pollutant through the focusing lens 232. The organic pollutant scatters the target circular beam. The scattered light includes Rayleigh scattered light and Raman scattered light, and the focusing lens 232 recollects the scattered light, the collected scattered light is adjusted into a parallel beam by the lens group 233. The light filter 234 filters the parallel beam to filter out the Rayleigh scattered light and retain the Raman scattered light.

In this embodiment, the focusing lens 232 acts not only as a focusing lens for incident laser light from the organic pollutant, but also as a collecting mirror for scattered light, forming a backscattered light path. The focusing lens 232 is preferably a lens with a focal length of 500 mm or 1000 mm and a diameter of 2 inches. The light filter 234 is preferably a long-pass filter, which is dedicated to laser light with a wavelength of 532 nm. The lens group 233 includes a second convex lens and a second concave lens. The scattered light is collected by the focusing lens 232 and converted into a near-parallel beam. The second convex lens focuses the near-parallel beam, and then converts the near-parallel beam into parallel light. The optical fiber coupling mirror 235 is preferably a third convex lens, and a collimation and a diameter of the parallel light match working parameters of the light filter 234.

Figure 4:
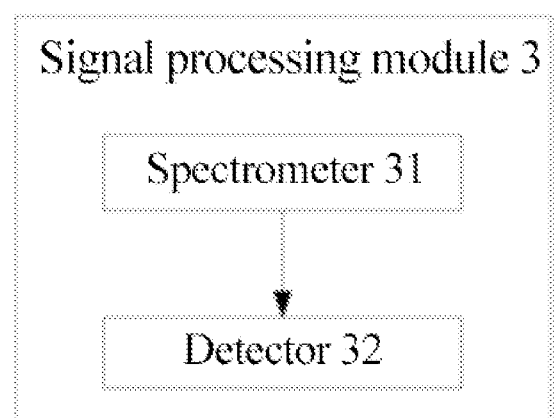
FIG. 4 is a structural block diagram of a signal processing module according to an embodiment of the present disclosure.

As shown in FIG. 4, the signal processing module 3 includes a spectrometer 31 and a detector 32. A light entrance of the spectrometer 31 is connected to the optical fiber coupling mirror 235 through an optical fiber to receive and decompose the Raman scattered light from the optical fiber coupling mirror 235 to obtain a spectral line. The detector 32 is connected to a light exit of the spectrometer 31 to detect the spectral line to obtain SERS spectrum data, and send the SERS spectrum data to the control module 4.

In an embodiment, the spectrometer 31 can decompose lasers with complex components into spectral lines according to different wavelengths, and the detector 32 converts the spectral lines into SERS spectrum data according to the intensity of the lasers of different wavelengths. In this embodiment, the detector 32 is preferably a time-resolved intensified charge coupled device camera (ICCD).

Figure 5:
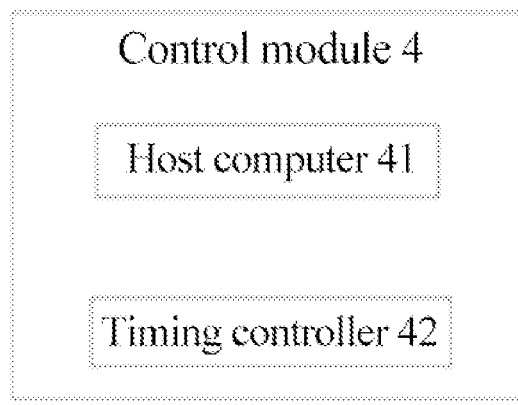
FIG. 5 is a structural block diagram of a control module according to an embodiment of the present disclosure.

As shown in FIG. 5, the control module 4 includes a host computer 41. The host computer 41 is connected to and adjusts the pulse laser 12, the half-wave plate 211, the first concave lens 222, the first convex lens 223, the spectrometer 31 and the detector 32. The host computer 41 receives and analyzes the SERS spectrum data to obtain the residual amount of the organic pollutant.

In an embodiment, the host computer 41 can adjust setting parameters of the pulse laser 12, the spectrometer 31 and the detector 32 to control a rotation angle of the electric rotating frame and a position of the electric translation stage, that is, the host computer 41 can control a rotation angle of the half-wave plate 211 and adjust a relative distance between the first concave lens 222 and the first convex lens 223. In this embodiment, the host computer 41 is preferably a computer, and the computer receives and analyzes the SERS spectrum data from the detector 32 to obtain the residual amount of the organic pollutant.

Further, the control module 4 further includes a timing controller 42. The timing controller 42 is connected to and adjusts the pulse laser 12 and the detector 32, such that a pulse timing of the pulse laser 12 is synchronized with a shutter timing of the detector 32.

In an embodiment, in order to enable the detector 32 to accurately capture the laser light and not to perform signal collection during blank time when there is no laser light, the timing controller 42 is required to synchronize the working timing of the two. The timing controller 42 will respectively send signal instructions to the pulse laser 12 and the detector 32. The pulse laser 12 and the detector 32 will have different response times after receiving the signal instructions at the same time. The pulsed laser generated by the pulse laser 12 is converted into the spectral line after a period of time and transmitted to the detector 32. In order to make shutter time of the detector 32 accurately cover a nanosecond width of the pulsed laser, it is necessary to adjust the delay before the detector 32 opens a shutter. After proper adjustment, it can be ensured that the detector 32 starts collecting when the spectral line reaches the detector 32, and the shutter of the detector 32 is closed when there is no spectral line. When temperature of the organic pollutant is above about 800° C., the heat radiation intensity generated by the organic pollutant is sufficient to cause great interference to the spectrum detection. Using timing control, it is possible to detect only when there are spectral lines, and not to detect during a large amount of blank time without spectral lines, so as to prevent the detector 32 from collecting excessive heat radiation interference signals.

In this embodiment, the timing controller 42 is preferably a digital delay generator (DDG), and controls the shutter timing of the control detector 32 to be synchronized with the pulse timing of the pulse laser 12 with a certain delay, and the shutter time for spectral line collection is limited to the nanosecond order of the pulse laser width. By limiting the shutter time of spectral line collection, it can effectively remove the influence of the black body radiation signal generated by the organic pollutant at high temperature on the spectrum analysis, such that the information of organic pollutant is more accurate and reliable, and the continuous measurement of the changes in the composition and structure of the organic pollutant at different temperatures are realized.

Figure 6:
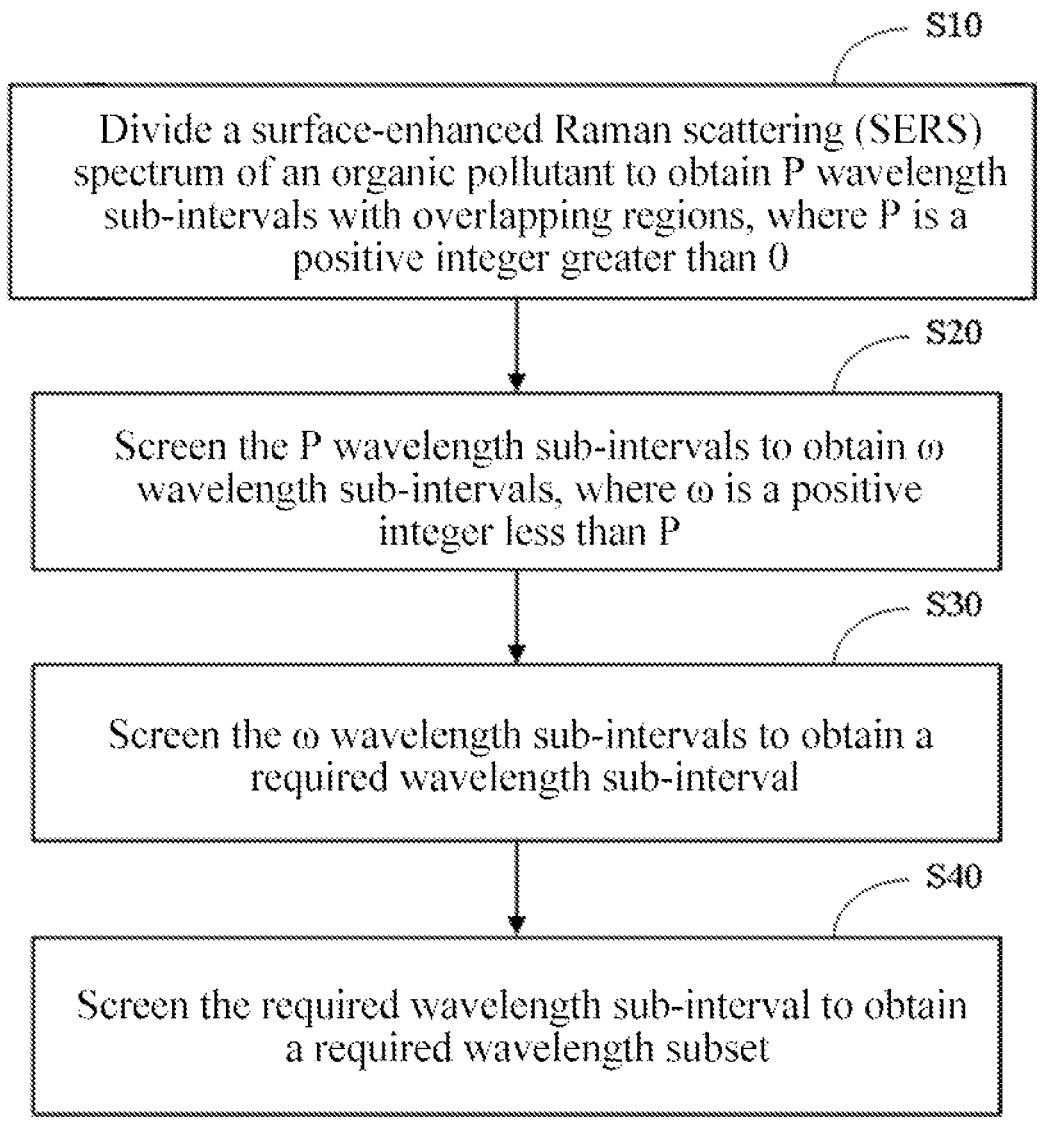
FIG. 6 is a flowchart of a method for extracting characteristic information of an organic pollutant in a complex system according to an embodiment of the present disclosure.

As shown in FIG. 6, in an embodiment, a method for extracting characteristic information of an organic pollutant in a complex system is provided. The method is applied to the server, and includes the following steps.

S10. A SERS spectrum of an organic pollutant is divided into P wavelength sub-intervals with overlapping regions, where P is a positive integer greater than 0.

Specifically, a user collects the SERS spectrum of the organic pollutant through the Raman spectrum detection device, and sends the collected SERS spectrum to the server. The server receives the SERS spectrum sent by the Raman spectrum detection device, and divides the SERS spectrum according to a width w of the wavelength sub-intervals to obtain the P(P=p−w+1) wavelength sub-intervals with overlapping regions. The width w of the wavelength sub-intervals is the number of wavelengths that ranges from 5 to 20, and p is the number of wavelengths of the SERS spectrum. The P wavelength sub-intervals with overlapping regions can prevent the missed sampling of valuable light waves used as the dividing lines, such that all light waves in the SERS spectrum can be sampled during division, guaranteeing the comprehensiveness of SERS spectrum extraction and improving the identification accuracy of organic pollutants.

For example, if $P_1$ wavelength sub-intervals are with a range of 200-300 nm, $P_2$ wavelength sub-intervals are with a range of 290-380 nm, and so on, $P_3$ wavelength sub-intervals are with a range of 370-420 nm.

S20. The P wavelength sub-intervals are screened to obtain ω wavelength sub-intervals, where ω is a positive integer less than P.

Figure 7:
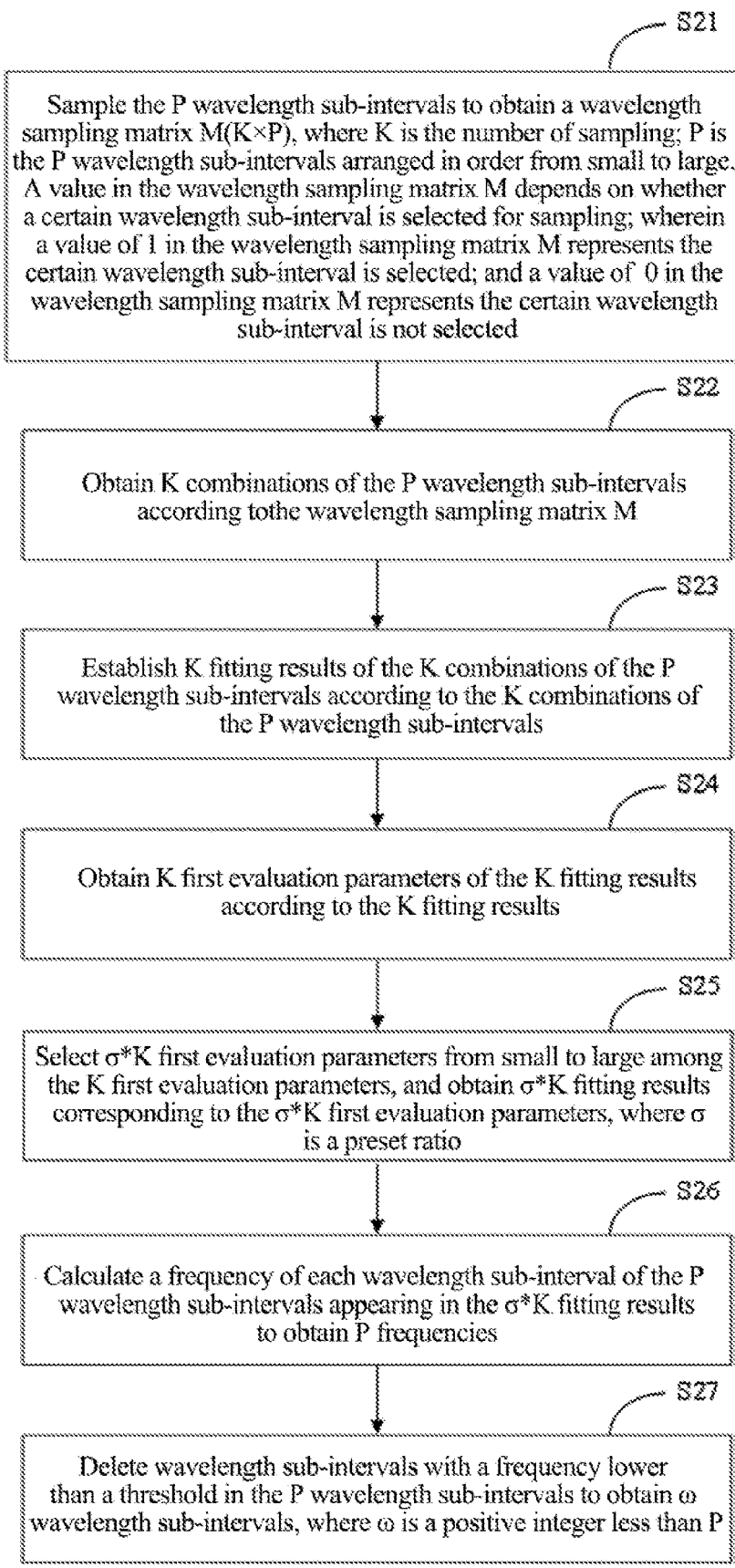
FIG. 7 is a flowchart of screening process according to an embodiment of the present disclosure.

As shown in FIG. 7, the step S20 specifically includes the following steps.

S21. The P wavelength sub-intervals are sampled to obtain a wavelength sampling matrix M(K×P), where K is the number of sampling; P is the P wavelength sub-intervals arranged in order from small to large. A value in the wavelength sampling matrix M depends on whether a certain wavelength sub-interval is selected for sampling; wherein a value of 1 in the wavelength sampling matrix M represents the certain wavelength sub-interval is selected; and a value of 0 in the wavelength sampling matrix M represents the certain wavelength sub-interval is not selected.

Figures 8, 9:
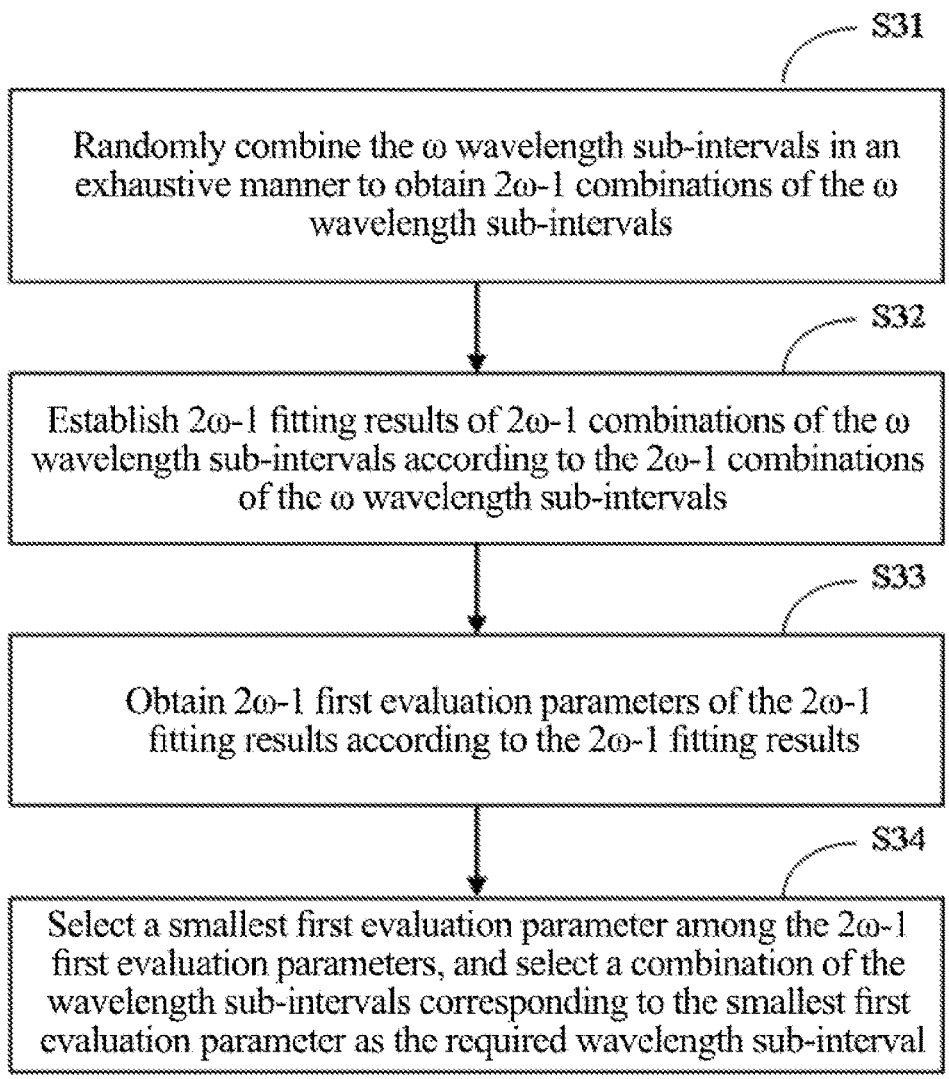
FIG. 8 is a schematic diagram of a wavelength sampling matrix M according to an embodiment of the present disclosure.
FIG. 9 is a flowchart of screening processing steps according to an embodiment of the present disclosure.

Specifically, the wavelength sampling matrix is used to randomly sample the P wavelength sub-intervals. As shown in FIG. 8, a wavelength sampling matrix M (10×10) containing the values of "1" and "0" is obtained, where K and P are all 10. 10 columns are respectively $P_1$, $P_2$, $P_3$, $P_4$, $P_5$, $P_6$, $P_7$, $P_8$, $P_9$ and $P_{10}$. In the wavelength sampling matrix M, the number of the element "1" is K*P*α, and the number of the element "0" is K*P*(1−α), where α is a percentage of the element "1" in each column of the wavelength sampling matrix M.

S22. K combinations of the P wavelength sub-intervals are obtained according to the wavelength sampling matrix M.

Specifically, each row is a combination of wavelength sub-intervals. As shown in FIG. 8, in the first row, $P_1$, $P_4$ and $P_6$ are not selected, and $P_2$, $P_3$, $P_5$, $P_7$, $P_8$, $P_9$ and $P_{10}$ are selected, so the combination of wavelength sub-intervals in the first row are $P_2$, $P_3$, $P_5$, $P_7$, $P_8$, $P_9$ and $P_{10}$. In the second row, $P_2$, $P_4$, $P_7$, and $P_9$ are not selected, and $P_1$, $P_3$, $P_5$, $P_6$, $P_8$ and $P_{10}$ are selected, so the combination of wavelength sub-intervals in the second row are $P_1$, $P_3$, $P_5$, $P_6$, $P_8$ and $P_{10}$.

S23. K fitting results of the K combinations of the P wavelength sub-intervals are established according to the K combinations of the P wavelength sub-intervals.

S24. K first evaluation parameters of the K fitting results are obtained according to the K fitting results.

Specifically, each first evaluation parameter represents a root mean square error of cross-validation of a calibration set. The first evaluation parameter is used to evaluate a predictive ability of the fitting result. The smaller the first evaluation parameter, the better the predictive ability of the fitting result.

S25. σ*K first evaluation parameters are selected from small to large among the K first evaluation parameters, and σ*K fitting results corresponding to the σ*K first evaluation parameters are obtained, where a is a preset ratio.

In this embodiment, σ is 5%-20%.

Specifically, the server selects the σ*K first evaluation parameters from small to large among the K first evaluation parameters to obtain the σ*K fitting results corresponding to the σ*K first evaluation parameters. The selected first evaluation parameters indicates that the corresponding fitting results have a better predictive ability, and those fitting results need to be reserved. The unselected first evaluation parameters indicate that predictive ability of the corresponding fitting results is poor, so those fitting results need to be eliminated. Such setting can prevent the fitting results with poor predictive ability from interfering with the extraction of valuable light waves, and the fitting results with better predictive ability can effectively extract valuable light waves, improving the robustness of the method for extracting characteristic information of the organic pollutant in the complex system.

S26. A frequency of each wavelength sub-interval of the P wavelength sub-intervals appearing in the σ*K fitting results is calculated to obtain P frequencies.

Specifically, the server calculates a frequency of each wavelength sub-interval of the P wavelength sub-intervals appearing in the σ*K fitting results to obtain P frequencies. When the frequency of a certain wavelength sub-interval is higher, it means that this wavelength sub-interval is more important, and the P wavelength sub-intervals are sorted according to the order of importance from large to small.

S27. Wavelength sub-intervals with a frequency lower than a threshold are deleted in the P wavelength sub-intervals to obtain co wavelength sub-intervals, where co is a positive integer less than P.

Specifically, the server uses a wavelength screening function to eliminate the less important wavelength sub-intervals. Assuming that the number of runs of the wavelength screening function is L, when the wavelength screening function runs for the ith time, a retention rate $r_i$ of the wavelength sub-interval can be calculated by equation (1):

$$r_i = e^{-\theta i} \qquad (1);$$

where θ is a constant; L is a positive integer greater than 0; and i is a positive integer less than L.

Specifically, θ is determined by the following two situations. In the first situation, when i=1, all P wavelength sub-intervals are reserved, and $r_1=1$. In the second situation, when the wavelength screening function runs for the Lth time, assuming that ω wavelength sub-intervals are reserved, $r_L=\omega/P$. Combining the above two situations, θ can be calculated by equation (2):

$$\frac{\ln(p/\varpi)}{L}. \qquad (2)$$

S30. The ω wavelength sub-intervals are screened to obtain a required wavelength sub-interval.

As shown in FIG. 9, the step S30 specifically includes the following steps.

S31. The ω wavelength sub-intervals are randomly combined in an exhaustive manner to obtain 2ω−1 combinations of the ω wavelength sub-intervals.

S32. 2ω−1 fitting results of 2ω−1 combinations of the ω wavelength sub-intervals are established according to the 2ω−1 combinations of the ω wavelength sub-intervals.

S33. 2ω−1 first evaluation parameters of the 2ω−1 fitting results are obtained according to the 2ω−1 fitting results.

S34. A smallest first evaluation parameter among the 2ω−1 first evaluation parameters is selected, and a combination of the wavelength sub-intervals corresponding to the smallest first evaluation parameter is selected as the required wavelength sub-interval.

S40. The required wavelength sub-interval is screened to obtain a required wavelength subset.

Figure 10:
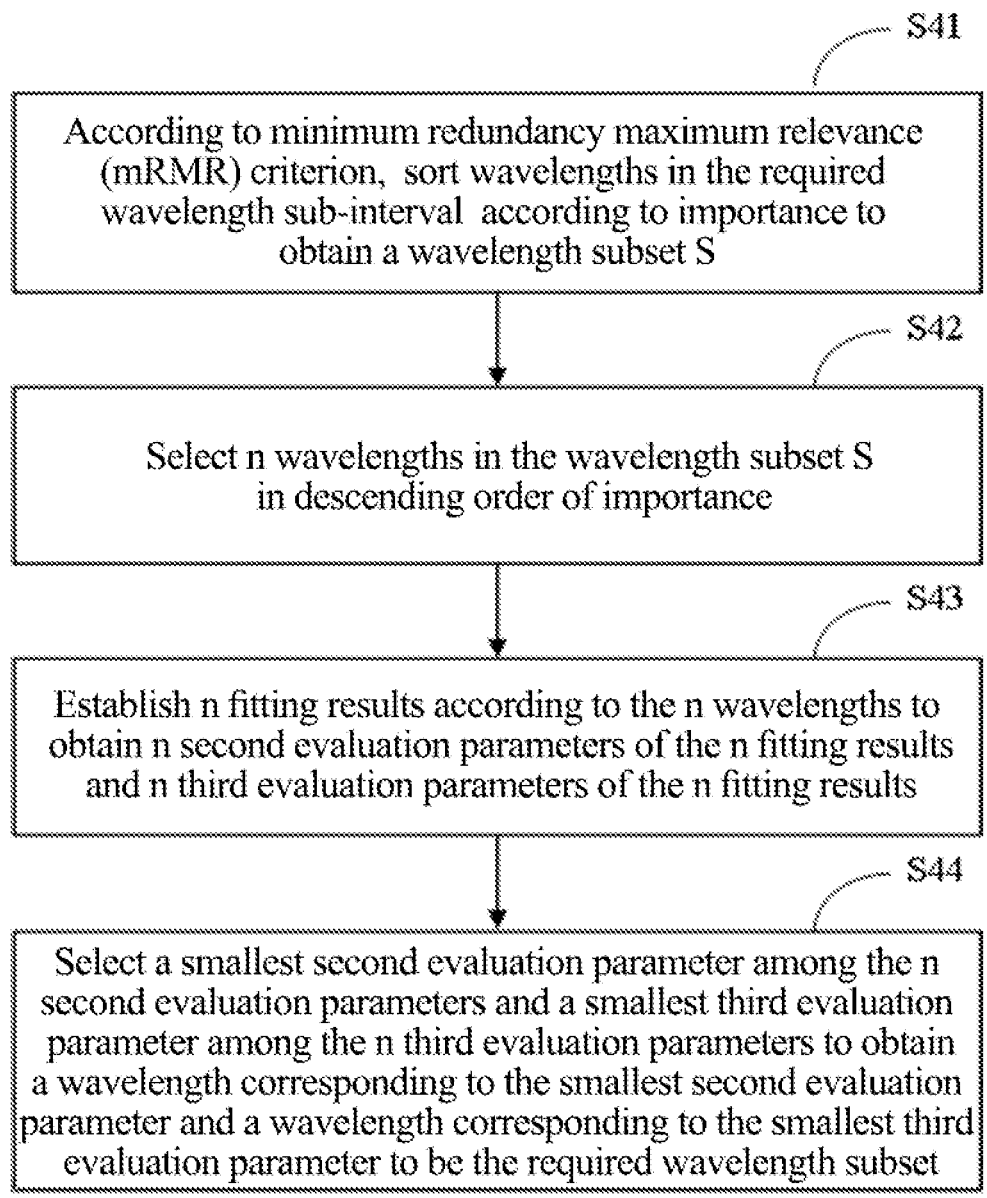
FIG. 10 is a flowchart of steps of obtaining a required wavelength subset according to an embodiment of the present disclosure.

As shown in FIG. 10, the S40 specifically includes the following steps.

S41. According to minimum redundancy maximum relevance (mRMR) criterion, wavelengths in the required wavelength sub-interval are sorted according to importance to obtain a wavelength subset S.

S42. n wavelengths in the wavelength subset S are selected in descending order of importance.

S43. n fitting results are established according to the n wavelengths to obtain n second evaluation parameters of the n fitting results and n third evaluation parameters of the n fitting results.

The second evaluation parameter represents the root mean square of calibration (RMSEC), the smaller the second evaluation parameter, the more reasonable the fitting result. The third evaluation parameter represents the root mean square error of prediction (RESEP), the smaller the third evaluation parameter, the more accurate the prediction of the fitting result.

S44. A smallest second evaluation parameter is selected among the n second evaluation parameters and a smallest third evaluation parameter is selected among the n third evaluation parameters to obtain a wavelength corresponding to the smallest second evaluation parameter and a wavelength corresponding to the smallest third evaluation parameter to be the required wavelength subset. Such setting can prevent the less valuable light waves from affecting the final test results, such that the valuable light waves can accurately reflect the structural characteristics of the organic pollutant, improving the robustness of the method for extracting characteristic information of the organic pollutant in the complex system.

In this embodiment, the SERS spectrum of the organic pollutant is divided to obtain P wavelength sub-intervals with overlapping regions. The P wavelength sub-intervals with overlapping regions can prevent the missed sampling of valuable light waves used as the dividing lines, such that all light waves in the SERS spectrum can be sampled during division, guaranteeing the comprehensiveness of SERS spectrum extraction and improving the identification accuracy of organic pollutants. The P wavelength sub-intervals are screened to obtain ω wavelength sub-intervals. The ω wavelength sub-intervals are screened to obtain a required wavelength sub-interval. The required wavelength sub-interval is screened to obtain a required wavelength subset. Such a setting can prevent the less valuable light waves from affecting the final test results, such that the valuable light waves can accurately reflect the structural characteristics of the organic pollutant, improving the robustness of the method for extracting characteristic information of the organic pollutant in the complex system.

Figure 11:
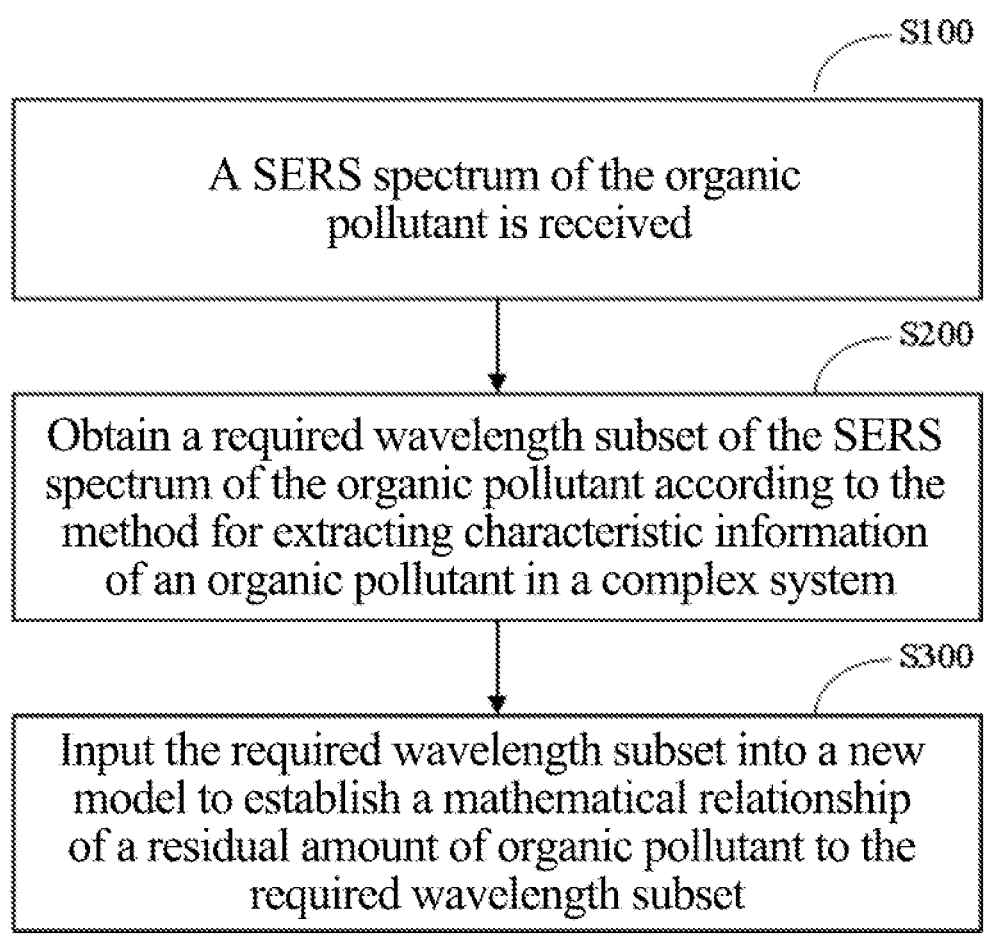
FIG. 11 is a flowchart of a method for fast detecting an organic pollutant in a complex system according to an embodiment of the present disclosure.

As shown in FIG. 11, in an embodiment, a method for fast detecting an organic pollutant in a complex system. The method is deployed in the server, and specifically includes the following steps.

S100. A SERS spectrum of the organic pollutant is received.

A user collects the SERS spectrum of the organic pollutant through the Raman spectrum detection device, and sends the collected SERS spectrum to the server. The server receives the SERS spectrum sent by the Raman spectrum detection device, and preprocesses the SERS spectrum.

Specifically, the server preprocesses the SERS spectrum through data smoothing and noise filtering methods such as wavelet analysis, adaptive filtering, orthogonal signal correction method and differential processing to obtain a processed SERS spectrum.

It can be understood that, in this embodiment, rapid means that a detection result can be obtained within 5 seconds.

S200. A required wavelength subset of the SERS spectrum of the organic pollutant is obtained according to the method for extracting characteristic information of an organic pollutant in a complex system.

S300. The required wavelength subset is input into a new model to establish a mathematical relationship of a residual amount of organic pollutant to the required wavelength subset.

The mathematical relationship is a new learning algorithm; an output of each convolutional layer in the mathematical relationship is directly related to an input small area. A training of the mathematical relationship adopts an adaptive moment estimation algorithm with a cross-entropy error loss function as an objective function; and the objective function is:

$$0 = \frac{1}{M}\sum_{m=1}^{M}\left[X_m\log\tilde{X}_m + (1 - X_m)\log(1 - \tilde{X}_m)\right] + \partial //\theta //^2;$$

where M is the number of samples; $X_m$ is a target category; $\tilde{X}_m$ is a predicted category; $\partial$ is the regularized coefficient; and $\theta$ is a weight.

The mathematical relationship is a new learning algorithm for one-dimensional spectrum signal processing. Compared with the existing mathematical relationship, the mathematical relationship in this embodiment considers the spatial information of the SERS spectrum, and reduces the risk of overfitting by enhancing the local connectivity mode between adjacent neurons, using spatial local correlation to study the local connection mode of the original SERS spectrum, and adopting the method of weight sharing. The mathematical relationship in this embodiment is much preferable in signal extraction and feature learning, and is more suitable for highly sensitive detection of the organic pollutant in the complex system.

Figure 12:
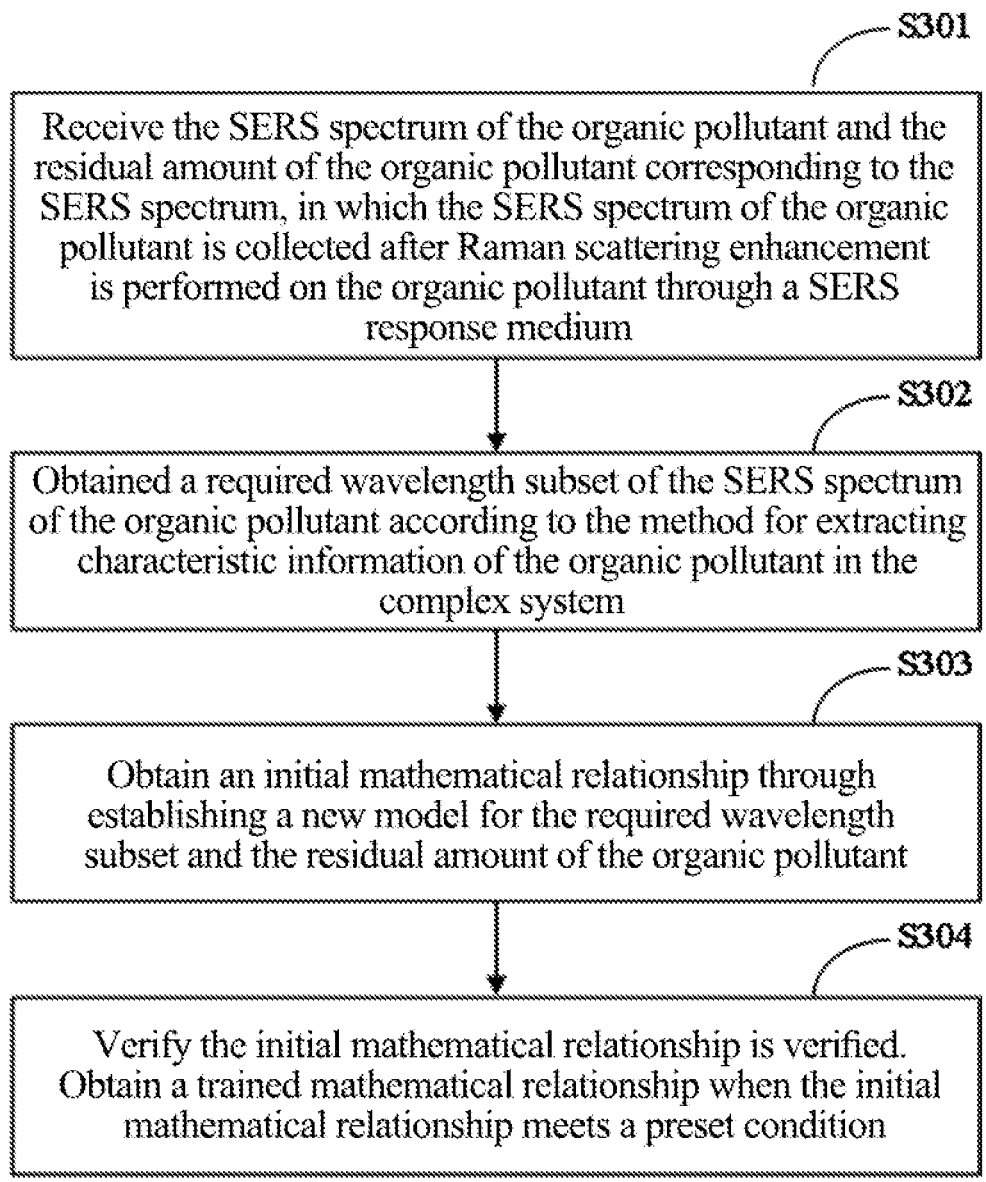
FIG. 12 is a flowchart of steps of a mathematical relationship training according to an embodiment of the present disclosure.

As shown in FIG. 12, in this embodiment, the step S300 specifically includes the following steps.

S301. The SERS spectrum of the organic pollutant and the residual amount of the organic pollutant corresponding to the SERS spectrum are received, in which the SERS spectrum of the organic pollutant is collected after Raman scattering enhancement is performed on the organic pollutant through a SERS response medium.

The user collects the SERS spectrum of the organic pollutant through the Raman spectrum detection device, and sends the collected SERS spectrum to the server. The server receives the SERS spectrum sent by the Raman spectrum detection device, and preprocesses the SERS spectrum.

Specifically, the server preprocesses the SERS spectrum through data smoothing and noise filtering methods such as wavelet analysis, adaptive filtering, orthogonal signal correction method and differential processing to obtain the processed SERS spectrum.

Specifically, the user detects the residual amount of the organic pollutant through a gas chromatograph, and sends the detected residual amount of the organic pollutant to the server. The server receives the residual amount of pollutants sent by the gas chromatograph.

S302. A required wavelength subset of the SERS spectrum of the organic pollutant is obtained according to the method for extracting characteristic information of the organic pollutant in the complex system.

Specifically, the server inputs the SERS spectrum of the organic pollutant to method for extracting characteristic information of the organic pollutant in the complex system to obtain the required wavelength subset.

S303. An initial mathematical relationship is obtained through establishing a new model for the required wavelength subset and the residual amount of the organic pollutant.

S304. The initial mathematical relationship is verified. A trained mathematical relationship is obtained when the initial mathematical relationship meets a preset condition.

Specifically, the user collects the SERS spectrum of the organic pollutant through the Raman spectrum detection device, and detects a residual amount of the organic pollutant through the gas chromatograph. The SERS spectrum is input into the initial mathematical relationship to obtain a residual amount of the organic pollutant corresponding to the SERS spectrum. The residual amount of the organic pollutant obtained through the initial mathematical relationship is compared to the detected residual amount of the organic pollutant. When the result of the comparison meets the preset requirements, the initial mathematical relationship can accurately obtain the residual amount of the organic pollutant according to the SERS spectrum of the organic pollutant. Therefore, the training of the new learning algorithm is stopped, and the trained mathematical relationship is obtained.

Figure 13:
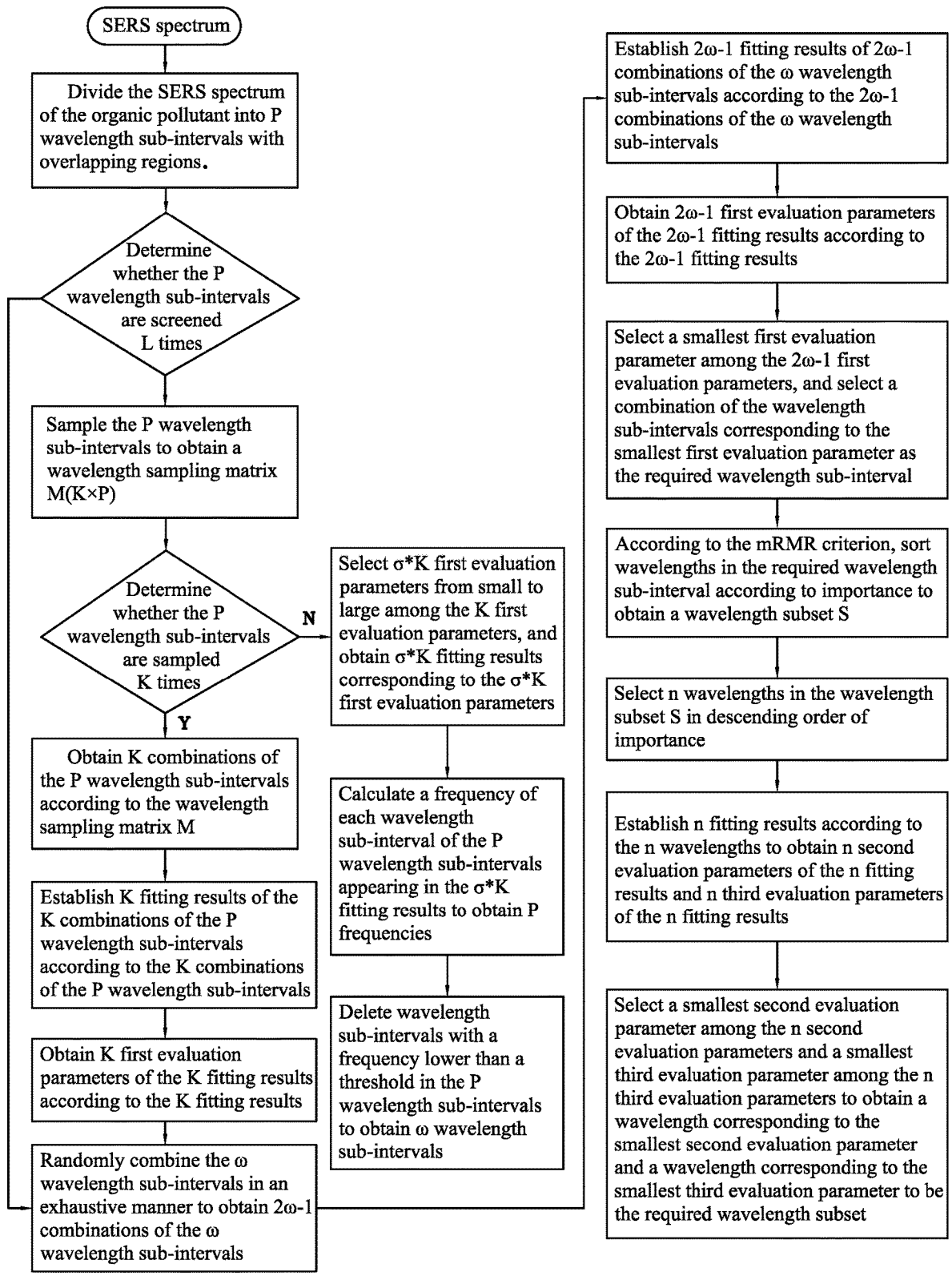
FIG. 13 is a flowchart of a method for extracting characteristic information of an organic pollutant in a complex system according to another embodiment of the present disclosure.

As shown in FIG. 13, in an embodiment, a method for extracting characteristic information of an organic pollutant in a complex system is provided. The method is applied to a server, and includes the following steps.

1) A SERS spectrum of an organic pollutant is received.

Specifically, a user collects the SERS spectrum of the organic pollutant through the Raman spectrum detection device, and sends the collected SERS spectrum to the server. The server receives the SERS spectrum sent by the Raman spectrum detection device.

2) The SERS spectrum of the organic pollutant is divided into P wavelength sub-intervals with overlapping regions, where P is a positive integer greater than 0.

Specifically, the server receives the SERS spectrum sent by the Raman spectrum detection device, and divides the SERS spectrum according to a width w of the wavelength sub-intervals to obtain the P(P=p−w+1) wavelength sub-intervals with overlapping regions. The width w of the wavelength sub-intervals is the number of wavelengths from 5 to 20, and p is the number of wavelengths of the SERS spectrum. The P wavelength sub-intervals with overlapping regions can prevent the missed sampling of valuable light waves used as the dividing lines, such that all light waves in the SERS spectrum can be sampled during division, guaranteeing the comprehensiveness of SERS spectrum extraction and improving the identification accuracy of organic pollutants.

3) It is determined whether the P wavelength sub-intervals are screened L times: if yes, proceed to step 12; if not, proceed to step 4.

4) The P wavelength sub-intervals are sampled to obtain a wavelength sampling matrix M(K×P), where K is the number of sampling; P is the P wavelength sub-intervals arranged in order from small to large. A value in the wavelength sampling matrix M depends on whether a certain wavelength sub-interval is selected for sampling; wherein a value of 1 in the wavelength sampling matrix M represents the certain wavelength sub-interval is selected; and a value of 0 in the wavelength sampling matrix M represents the certain wavelength sub-interval is not selected.

Specifically, the wavelength sampling matrix is used to randomly sample the P wavelength sub-intervals. As shown in FIG. 8, a wavelength sampling matrix M (10×10) containing the values of "1" and "0" is obtained, where K and P are all 10. 10 columns are respectively $P_1$, $P_2$, $P_3$, $P_4$, $P_5$, $P_6$, $P_7$, $P_8$, $P_9$ and $P_{10}$. In the wavelength sampling matrix M, the number of the element "1" is K*P*α, and the number of the element "0" is K*P*(1−α), where α is a percentage of the element "1" in each column of the wavelength sampling matrix M.

5) It is determined whether the P wavelength sub-intervals are sampled K times; if yes, proceed to step 6, if not, proceed to step 9.

6) K combinations of the P wavelength sub-intervals are obtained according to the wavelength sampling matrix M.

Specifically, each row is a combination of wavelength sub-intervals. As shown in FIG. 8, in the first row, $P_1$, $P_4$ and $P_6$ are not selected, and $P_2$, $P_3$, $P_5$, $P_7$, $P_8$, $P_9$ and $P_{10}$ are selected, so the combination of wavelength sub-intervals in the first row are $P_1$, $P_3$, $P_5$, $P_7$, $P_8$, $P_9$ and $P_{10}$. In the second row, $P_2$, $P_4$, $P_7$, and $P_9$ are not selected, and $P_1$, $P_3$, $P_5$, $P_6$, $P_8$ and $P_{10}$ are selected, so the combination of wavelength sub-intervals in the second row are $P_1$, $P_3$, $P_5$, $P_6$, $P_8$ and $P_{10}$.

7) K fitting results of the K combinations of the P wavelength sub-intervals are established according to the K combinations of the P wavelength sub-intervals.

8) K first evaluation parameters of the K fitting results are obtained according to the K fitting results.

Specifically, each first evaluation parameter represents a root mean square error of cross-validation of a calibration set. The first evaluation parameter is used to evaluate a predictive ability of the fitting result. The smaller the first evaluation parameter, the better the predictive ability of the fitting result.

9) σ*K first evaluation parameters are selected from small to large among the K first evaluation parameters, and σ*K fitting results corresponding to the σ*K first evaluation parameters are obtained, where σ is a preset ratio.

Specifically, the server selects the σ*K first evaluation parameters from small to large among the K first evaluation parameters to obtain the σ*K fitting results corresponding to the σ*K first evaluation parameters. The selected first evaluation parameters indicates that the corresponding fitting results have a better predictive ability, and those fitting results need to be reserved. The unselected first evaluation parameters indicate that predictive ability of the corresponding fitting results is poor, so those fitting results need to be eliminated. Such setting can prevent the fitting results with poor predictive ability from interfering with the extraction of valuable light waves, and the fitting results with better predictive ability can effectively extract valuable light waves, improving the robustness of the method for extracting characteristic information of the organic pollutant in the complex system.

10) A frequency of each wavelength sub-interval of the P wavelength sub-intervals appearing in the σ*K fitting results is calculated to obtain P frequencies.

Specifically, the server calculates a frequency of each wavelength sub-interval of the P wavelength sub-intervals appearing in the σ*K fitting results to obtain P frequencies. When the frequency of a certain wavelength sub-interval is higher, it means that this wavelength sub-interval is more important, and the P wavelength sub-intervals are sorted according to the order of importance from large to small.

11) Wavelength sub-intervals with a frequency lower than a threshold are deleted in the P wavelength sub-intervals to obtain ω wavelength sub-intervals, where w is a positive integer less than P.

Specifically, the server uses a wavelength screening function to eliminate the less important wavelength sub-intervals. Assuming that the number of runs of the wavelength screening function is L, when the wavelength screening function runs for the ith time, a retention rate $r_i$ of the wavelength sub-interval can be calculated by equation (1):

$$r_i = e^{-\theta i} \quad (1);$$

where θ is a constant; L is a positive integer greater than 0; and i is a positive integer less than L.

Specifically, θ is determined by the following two situations. In the first situation, when i=1, all P wavelength sub-intervals are reserved, and $r_1$=1. In the second situation, when the wavelength screening function runs for the Lth time, assuming that ω wavelength sub-intervals are reserved, $r_L$=ω/P. Combining the above two situations, θ can be calculated by equation (2):

$$\frac{\ln(p/\varpi)}{L}. \quad (2)$$

12) The ω wavelength sub-intervals are randomly combined in an exhaustive manner to obtain 2ω−1 combinations of the ω wavelength sub-intervals.

13) 2ω−1 fitting results of 2ω−1 combinations of the ω wavelength sub-intervals are established according to the 2ω−1 combinations of the ω wavelength sub-intervals.

14) 2ω−1 first evaluation parameters of the 2ω−1 fitting results are obtained according to the 2ω−1 fitting results.

15) A smallest first evaluation parameter among the 2ω−1 first evaluation parameters is selected, and a combination of the wavelength sub-intervals corresponding to the smallest first evaluation parameter is selected as the required wavelength sub-interval.

16) According to the mRMR criterion, wavelengths in the required wavelength sub-interval are sorted according to importance to obtain a wavelength subset S.

17) n wavelengths in the wavelength subset S are selected in descending order of importance.

18) n fitting results are established according to the n wavelengths to obtain n second evaluation parameters of the n fitting results and n third evaluation parameters of the n fitting results.

The second evaluation parameter represents the root mean square of calibration (RMSEC), the smaller the second evaluation parameter, the more reasonable the fitting result. The third evaluation parameter represents the root mean square error of prediction (RESEP), the smaller the third evaluation parameter, the more accurate the prediction of the fitting result.

19) A smallest second evaluation parameter is selected among the n second evaluation parameters and a smallest third evaluation parameter is selected among the n third evaluation parameters to obtain a wavelength corresponding to the smallest second evaluation parameter and a wavelength corresponding to the smallest third evaluation parameter to be the required wavelength subset. Such setting can prevent the less valuable light waves from affecting the final test results, such that the valuable light waves can accurately reflect the structural characteristics of the organic pollutant, improving the robustness of the method for extracting characteristic information of the organic pollutant in the complex system.

In this embodiment, the SERS spectrum of the organic pollutant is divided to obtain P wavelength sub-intervals with overlapping regions. The P wavelength sub-intervals with overlapping regions can prevent the missed sampling of valuable light waves used as the dividing lines, such that all light waves in the SERS spectrum can be sampled during division, guaranteeing the comprehensiveness of SERS spectrum extraction and improving the identification accuracy of organic pollutants. The P wavelength sub-intervals are screened to obtain ω wavelength sub-intervals. The ω wavelength sub-intervals are screened to obtain a required wavelength sub-interval. A required wavelength subset is obtained according to the required wavelength sub-interval. Such a setting can prevent the less valuable light waves from affecting the final test results, such that the valuable light waves can accurately reflect the structural characteristics of the organic pollutant, improving the robustness of method for extracting characteristic information of the organic pollutant in the complex system.

The above-mentioned is preferred embodiments of this disclosure, and does not limit the scope of the present disclosure. Any equivalent structural transformations and direct/indirect applications in other related technical fields based on the spirit of this disclosure should fall within the scope of the present disclosure.

What is claimed is:

1. A system for fast detecting an organic pollutant in a complex system, comprising:
   a surface-enhanced Raman scattering (SERS) response medium configured for enhancing a Raman scattering intensity of the organic pollutant, the SERS response medium comprising:
   a SERS substrate; and
   a nucleic acid strand;
   a binding site of the nucleic acid strand is obtained according to a pairing template of the nucleic acid strand; and the SERS substrate is site-selectively assembled to the binding site of the nucleic acid strand to obtain the SERS response medium,
   a reaction generating device configured for allowing the organic pollutant and the SERS response medium to react thereon;
   a Raman spectrum detection device configured for collecting a SERS spectrum of the organic pollutant after a reaction occurs on the reaction generating device and configured for sending the SERS spectrum of the organic pollutant to a server; and
   the server signally connected to the Raman spectrum detection device; the server being configured to perform:
   receiving the SERS spectrum of the organic pollutant sent by the Raman spectrum detection device and obtaining a residual amount of the organic pollutant in response to the SERS spectrum of the organic pollutant;
   obtaining a required wavelength subset of the SERS spectrum of the organic pollutant by:
   dividing a surface-enhanced Raman scattering (SERS) spectrum of an organic pollutant to obtain ω wavelength sub-intervals with overlapping regions; wherein P is a positive integer greater than 0;
   screening the ω wavelength sub-intervals to obtain w wavelength sub-intervals; wherein ω is a positive integer less than P;

screening the ω wavelength sub-intervals to obtain a required wavelength sub-interval; and screening the required wavelength sub-interval to obtain a required wavelength subset;

obtaining an initial mathematical relationship through establishing a new model for the required wavelength subset and the residual amount of the organic pollutant; and verifying the initial mathematical relationship, and obtaining a trained mathematical relationship when the initial mathematical relationship meets a preset condition.

2. The system of claim 1, wherein the system further comprises:

a terminal;

wherein the terminal is signally connected to the server; the terminal sends a query to the server for a detection result of the organic pollutant; the server generates a corresponding query result according to the query and sends the query result to the terminal; and the terminal displays the detection result of the organic pollutant according to the query result.

3. The system of claim 1, wherein a SERS spectrum cloud analysis platform is built on the server; the SERS spectrum cloud analysis platform is configured to store SERS spectrum data and a source program of the detection method; and the server provides an IP address and a listening port for the terminal to request access, so as to enable the terminal to query historical SERS spectrum data and update a source program of the detection method from the SERS spectrum cloud analysis platform through the IP address and the listening port.

4. The system of claim 1, wherein the reaction generating device comprises:

a hydrophilic layer; and a hydrophobic layer;

wherein the hydrophilic layer is configured to absorb the organic pollutant and the SERS response medium dropped thereon; the organic pollutant and the SERS response medium are dropped at different locations; and the hydrophobic layer is configured to guide the organic pollutant and the SERS response medium at different positions on the hydrophilic layer to a reaction position on the hydrophilic layer such that the organic pollutant and the SERS response medium react at the reaction position.

5. The system of claim 4, wherein the hydrophilic layer comprises:

a first area;

a second area; and a third area;

wherein the first area and the second area are respectively connected to the third area; the first area is configured to absorb the organic pollutant dropped thereon; the second area is configured to absorb the SERS response medium dropped thereon; the hydrophobic layer wraps the first area, the second area and the third area to guide the organic pollutant dropped on the first area and the SERS response medium dropped on the second area to the third area, such that the organic pollutant and the SERS response medium reacts in the third area; one side of the first area, one side of the second area and one side of the third area are not wrapped by the hydrophobic layer; the organic pollutant is capable of being dropped on the first area through the side of the first area not wrapped by the hydrophobic layer; and the SERS response medium is capable of being dropped on the second area through the side of the second area not wrapped by the hydrophobic layer.

6. The system of claim 4, wherein the hydrophilic layer is made of a film material with a porosity of 50%-80%.

7. The system of claim 1, wherein the step of screening the P wavelength sub-intervals to obtain the ω wavelength sub-intervals comprises:

sampling the P wavelength sub-intervals to obtain a wavelength sampling matrix M(K×P); wherein K is the number of sampling; P is the P wavelength sub-intervals arranged in order from small to large; a value in the wavelength sampling matrix M depends on whether a certain wavelength sub-interval is selected for sampling; wherein a value of 1 in the wavelength sampling matrix M represents the certain wavelength sub-interval is selected; and a value of 0 in the wavelength sampling matrix M represents the certain wavelength sub-interval is not selected;

obtaining K combinations of the P wavelength sub-intervals according to the wavelength sampling matrix M;

establishing K fitting results of the K combinations of the P wavelength sub-intervals according to the K combinations of the P wavelength sub-intervals;

obtaining K first evaluation parameters of the K fitting results according to the K fitting results;

selecting σ*K first evaluation parameters from small to large among the K first evaluation parameters and obtaining σ*K fitting results corresponding to the σ*K first evaluation parameters; wherein σ is a preset ratio;

calculating a frequency of each wavelength sub-interval of the P wavelength sub-intervals appearing in the σ*K fitting results to obtain P frequencies; and deleting wavelength sub-intervals with a frequency lower than a threshold in the P wavelength sub-intervals to obtain the ω wavelength sub-intervals; wherein ω is a positive integer less than P.

8. The system of claim 1, wherein the step of screening the ω wavelength sub-intervals to obtain the required wavelength sub-interval comprises:

randomly combining the ω wavelength sub-intervals in an exhaustive manner to obtain 2ω−1 combinations of the ω wavelength sub-intervals;

establishing 2ω−1 fitting results of 2ω−1 combinations of the ω wavelength sub-intervals according to the 2ω−1 combinations of the ω wavelength sub-intervals;

obtaining 2ω−1 first evaluation parameters of the 2ω−1 fitting results according to the 2ω−1 fitting results; and selecting a smallest first evaluation parameter among the 2ω−1 first evaluation parameters and obtaining a combination of the wavelength sub-intervals corresponding to the smallest first evaluation parameter as the required wavelength sub-interval.

9. The system of claim 1, wherein the step of screening the required wavelength sub-interval to obtain the required wavelength subset comprises:

according to minimum redundancy maximum relevance (mRMR) criterion, sorting wavelengths in the required wavelength sub-interval according to importance to obtain a wavelength subset S;

selecting n wavelengths in the wavelength subset S in descending order of importance;

establishing n fitting results according to the n wavelengths and obtaining n second evaluation parameters of the n fitting results and n third evaluation parameters of the n fitting results; and selecting a smallest second evaluation parameter among the n second evaluation parameters and a smallest third evaluation parameter among the n third evaluation parameters; and obtaining a wavelength corresponding to the smallest second evaluation parameter and a wavelength corresponding to the smallest third evaluation parameter to be the required wavelength subset.

10. The system of claim 1, wherein the trained mathematical relationship is obtained through a training that adopts an adaptive moment estimation algorithm with a cross-entropy loss function as an objective function, and the objective function is:

$$O = \frac{1}{M}\sum_{m=1}^{M}\left[X_m \log \tilde{X}_m + (1-X_m)\log(1-\tilde{X}_m)\right] + \partial \, // \, \theta \, //^2;$$

wherein M is the number of samples; $X_m$ is a target category; $\tilde{X}_m$ is a predicted category; $\partial$ is the regularized coefficient; and $\theta$ is a weight.

* * * * *